A. J. WESTBURG.
EMERGENCY TIRE.
APPLICATION FILED AUG. 19, 1914.

1,172,573. Patented Feb. 22, 1916.

ALBERT J. WESTBURG
INVENTOR.

WITNESSES:
Leo Matthews
Donald A. Westburg

BY Fred. D. Silloway
ATTORNEY

UNITED STATES PATENT OFFICE.

ALBERT J. WESTBURG, OF SPRINGFIELD, ILLINOIS.

EMERGENCY-TIRE.

1,172,573.

Specification of Letters Patent.   Patented Feb. 22, 1916.

Application filed August 19, 1914.   Serial No. 857,599.

*To all whom it may concern:*

Be it known that I, ALBERT J. WESTBURG, a citizen of the United States, residing at Springfield, in the county of Sangamon and State of Illinois, have invented new and useful Improvements in Emergency-Tires, of which the following is a specification.

My invention relates to emergency tires for automobiles and applies more particularly to devices of the type adapted to temporarily replace the ordinary pneumatic tire which has become injured.

The object of my invention is to provide an emergency tire which will be an effective rim protector when running an automobile without the pneumatic tire, and which may be compactly stored, easily and speedily applied to and removed from the rim of the wheel, and which will be simple and inexpensive of manufacture.

With the foregoing and other objects in view, my invention consists of the new and useful details of construction, and arrangement and combination of parts described herein, illustrated in the annexed drawings, and pointed out in the appended claims.

In the accompanying drawings, to which reference will be had, like characters of reference refer to like or corresponding parts throughout the several views.

Figure 1:
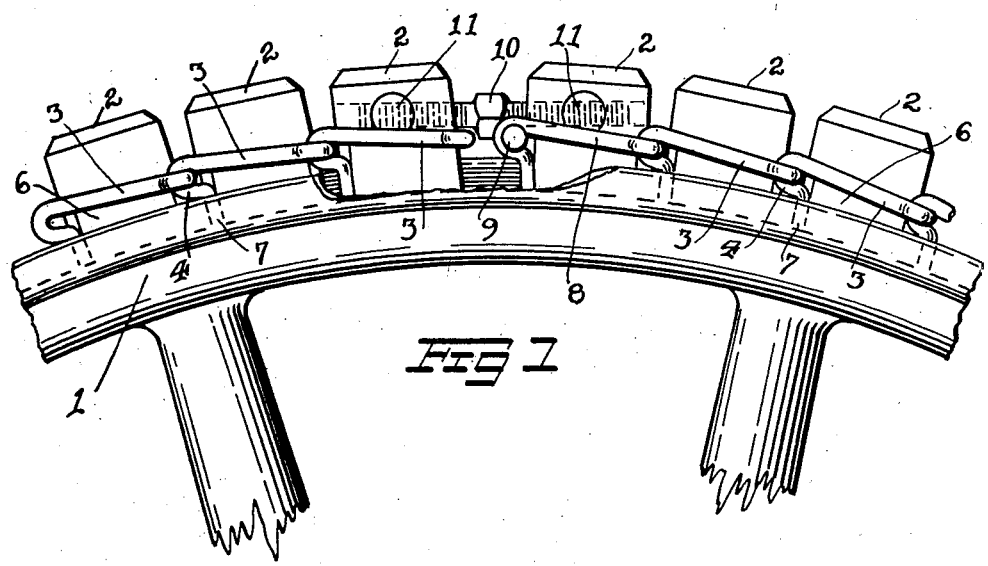
Figure 2:
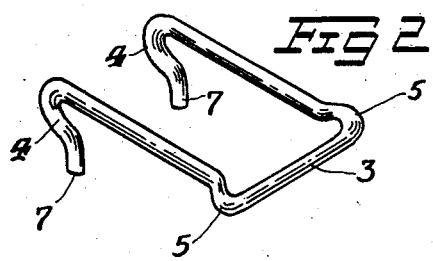
Figure 4:
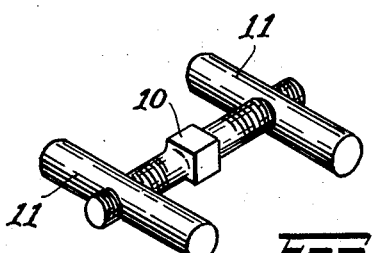
Figure 3:
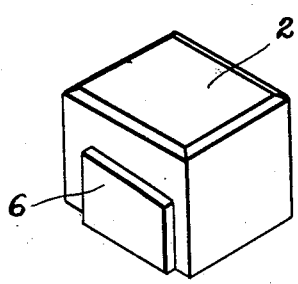

In the drawings, wherein the preferred embodiment of my invention is shown, Figure 1 is a fragmentary side elevation of my invention shown in its working position on the rim of an automobile wheel. Fig. 2 is a detail perspective view of one of the link members. Fig. 3 is a detail perspective view of one of the block members. Fig. 4 is a perspective view of the means for coupling the ends of the tire together.

Referring now to the drawings, numeral 1 designates the rim of an automobile wheel, which may be of any of the usual types of construction, wherein a straight rim is embodied. Numeral 2 designates a plurality of blocks, preferably formed of hard wood—the grain running vertically of the block—which blocks are adapted to fit into a series of links 3, the bottom of the blocks being preferably rounded to suit the diameter of the wheel rim. Links 3 are linked together by means of hooks 4 on the rear of one link engaging over the forward lateral portion of the next adjacent link. Blocks 2 are inserted from the under side of the assembled links, the upper edge of the block being chamfered to allow the block to be thus forced into the link top first. Lugs 6 are formed on the outer and inner sides of each of the blocks, which lugs are adapted to prevent the blocks from passing entirely through the links. Hooks 4 of the links are provided with down-turned projections 7, which projections are of a predetermined length so that, when the block 2 is in place in the link, the end of the projection 7 will be on a line with the bottom of the block.

In assembling my emergency tire, the "last" link, which has been designated as 8, is provided with a pin 9, over which hooks 4 are adapted to link. The "first" and "last" blocks are provided with means for coupling the two ends of the tire together, which means comprises a turn-buckle device having a bolt 10 provided with oppositely threaded end portions adapted to mesh with correspondingly threaded cross pin 11 carried by each of the end blocks. Cross pins 11 are securely fitted in each of the end blocks and may be dowel-pinned in place, while openings for bolt 10 are provided at right angles thereto.

In applying my tire to an automobile wheel, the assembled tire is placed about the rim and the "first" and "last" links are brought together. Bolt 10 is entered into the holes provided therefor in each of the end blocks and the bolt is revolved into the pins 11, and thus the tire may be drawn tightly about the rim. When the weight of the automobile is placed on the blocks, and the wheel brought into use, the down-turned projections 7 will effectively prevent the hooks 4 from pulling out of engagement with the lateral forward portion of the next adjacent link.

From the foregoing description, it will be readily seen that my invention provides an emergency tire which will be an effective rim protector when running an automobile without the usual pneumatic tire, and which may be compactly stored, easily and speedily applied to and removed from the rim of an automobile wheel, and which will be simple and inexpensive of manufacture.

While I have herein described and illustrated the preferred embodiment of my invention, I do not wish to be limited strictly to the details shown, as it is obvious that the arrangement and combination of parts may be varied in many ways, without departing from the spirit of my invention.

Having thus described my invention, what I claim is:—

1. In an emergency tire for automobiles, a plurality of coacting links adapted to be carried about the rim of an automobile wheel, each of said links being substantially U-shaped and having hooks adapted to engage with the next adjacent link, said hook portions of each link provided with down-turned projections resting on the rim of the wheel, block fillers for each of said links, and means for attaching the first and last links together to form an endless tire, substantially as described.

2. In an emergency tire for automobiles, a plurality of coacting links adapted to be carried about the rim of an automobile wheel, each of said links being formed of wire bent substantially U-shaped, the ends of the wire forming each link being bent to provide parallel hooks positioned to engage the central end portion of the next adjacent link, said hook portions provided with down-turned projections resting on the rim of the wheel, block fillers for each of said links, and means for attaching the first and last link together to form an endless tire, substantially as described.

ALBERT J. WESTBURG.

Witnesses:
DONALD A. WESTBERG,
LEO MATTHEWS.

Copies of this patent may be obtained for five cents each, by addressing the "Commissioner of Patents, Washington, D. C."